United States Patent
Han et al.

(10) Patent No.: US 11,209,524 B2
(45) Date of Patent: Dec. 28, 2021

(54) DETECTION SYSTEM AND METHOD FOR CHARACTERIZING TARGETS

(71) Applicant: Veoneer US, Inc., Southfield, MI (US)

(72) Inventors: Qh Han, Lowell, MA (US); Jordan Brauer, Chelmsford, MA (US)

(73) Assignee: Veoneer US, Inc., Southfield, MI (US)

( * ) Notice: Subject to any disclaimer, the term of this patent is extended or adjusted under 35 U.S.C. 154(b) by 263 days.

(21) Appl. No.: 16/587,231

(22) Filed: Sep. 30, 2019

(65) Prior Publication Data
US 2021/0096213 A1     Apr. 1, 2021

(51) Int. Cl.
*G01S 7/40* (2006.01)
*G01S 13/931* (2020.01)
*G01S 13/52* (2006.01)
*G01S 13/00* (2006.01)

(52) U.S. Cl.
CPC .............. *G01S 7/40* (2013.01); *G01S 7/4026* (2013.01); *G01S 13/52* (2013.01); *G01S 13/931* (2013.01); *G01S 7/403* (2021.05); *G01S 2013/93271* (2020.01)

(58) Field of Classification Search
CPC .... G01S 7/2925; G01S 7/2926; G01S 13/904; G01S 13/9019; G01S 13/9027; G01S 13/9011
See application file for complete search history.

(56) References Cited

U.S. PATENT DOCUMENTS

| | | | | |
|---|---|---|---|---|
| 3,683,380 A | * | 8/1972 | Cantwell, Jr. | G01S 7/2925 342/90 |
| 3,693,100 A | * | 9/1972 | Brown | G01S 7/2926 327/98 |
| 4,132,989 A | * | 1/1979 | Frosch | G01S 13/9011 342/25 D |
| 4,831,383 A | * | 5/1989 | Ohnishi | G01S 13/9027 342/22 |
| 5,043,734 A | * | 8/1991 | Niho | G01S 13/9019 342/25 A |
| 5,184,134 A | * | 2/1993 | Niho | G01S 13/9019 342/25 D |
| 5,977,906 A | * | 11/1999 | Ameen | G01S 7/4026 342/174 |

(Continued)

OTHER PUBLICATIONS

Kellner, D., et al. Instantaneous Ego-Motion Estimation using Doppler Radar. Proceedings of the 16th International IEEE Annual Conference on Intelligent Transportation Systems (ITSC 2013), The Hague, The Netherlands, Oct. 6-9, 2013.

*Primary Examiner* — Bernarr E Gregory
(74) *Attorney, Agent, or Firm* — Burns & Levinson LLP; Steven M. Mills

(57) ABSTRACT

A detection system and method for characterizing targets in an environment around vehicle. Signals are transmitted into the environment and return signals that have reflected off targets are received. The targets are initial characterized based on their return signals and the ego-motion of vehicle as determined from sensors on the vehicle. Corrections are determined based on the position of targets with respect to the azimuth range of the detection system and the side of the target with respect to a boresight. The initial characterizations are then adjusted to obtain a final target characterization.

20 Claims, 7 Drawing Sheets

(56) References Cited

U.S. PATENT DOCUMENTS

| | | | |
|---|---|---|---|
| 6,037,892 A * | 3/2000 | Nikias | G01S 13/904 |
| | | | 342/25 F |
| 7,443,335 B2 | 10/2008 | Kai et al. | |
| 9,470,777 B2 * | 10/2016 | Arage | G01S 13/931 |
| 10,024,955 B2 | 7/2018 | Song et al. | |
| 10,114,106 B2 | 10/2018 | Schiffmann et al. | |
| 2015/0323651 A1 | 11/2015 | Poiger et al. | |
| 2016/0146925 A1 * | 5/2016 | Millar | G01S 13/931 |
| | | | 342/113 |
| 2018/0156909 A1 * | 6/2018 | Kitamura | G01S 13/931 |

* cited by examiner

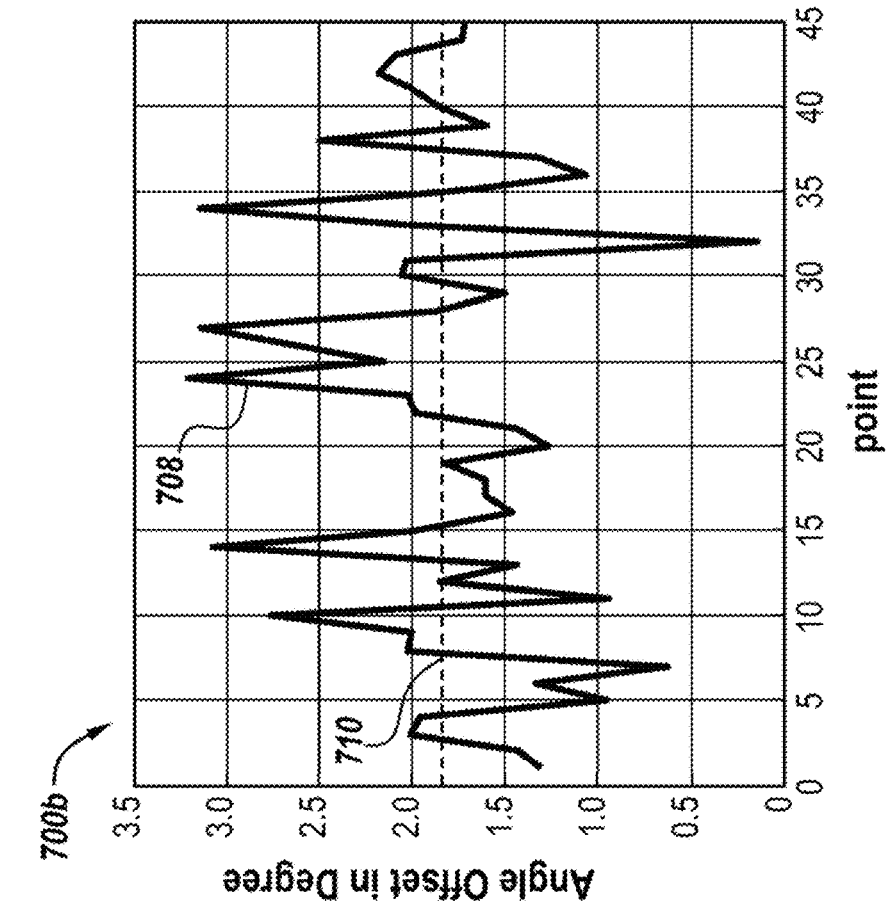
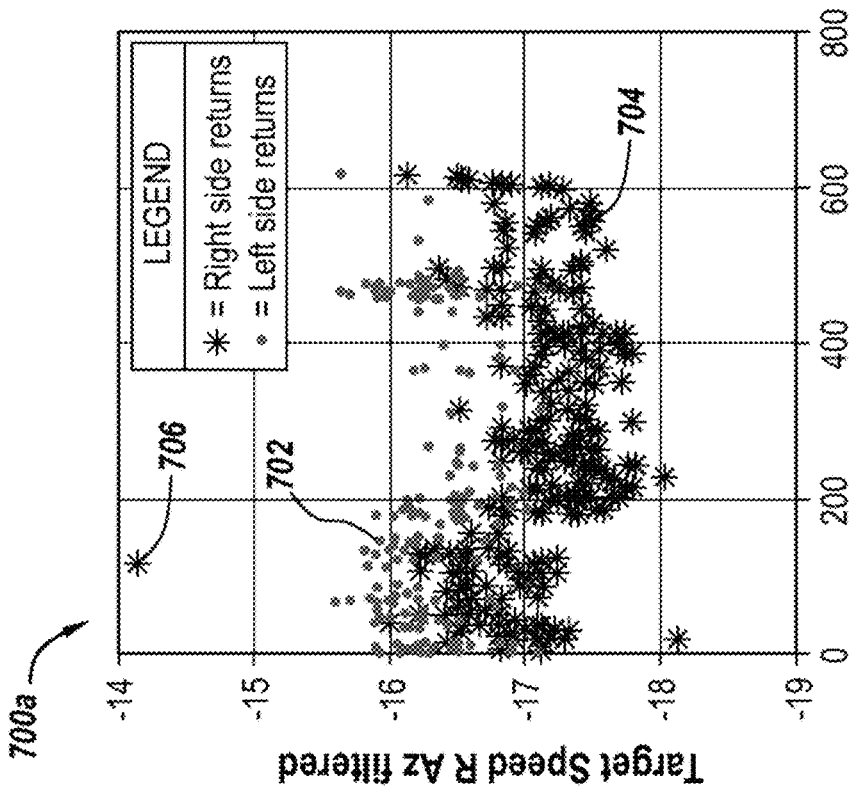
Fig. 7b
Fig. 7a

DETECTION SYSTEM AND METHOD FOR CHARACTERIZING TARGETS

FIELD OF THE TECHNOLOGY

The subject disclosure relates to object detection and more particularly to detection systems for vehicles which characterize targets within a surrounding environment.

BACKGROUND OF THE TECHNOLOGY

Vehicles often include detection systems which can be used for collision avoidance, self-driving, cruise control, and the like. Typical detection systems can rely on the reflections of transmitted signals off objects within the surrounding environment to characterize targets. By analyzing the return signals, information can be gathered about the targets in the environment. The ego-motion of the vehicle can affect the detection system's perception of the return signals. Therefore, after determining the ego-motion of the vehicle such as through an analysis of the data from sensors on the vehicle, characterizations of the targets can be made which account for the ego-motion of the vehicle.

While vehicle detection systems determine and account for certain known errors, such as the motion of the vehicle, inaccuracies still persist. Applying corrective calculations to these known errors can remedy certain errors, but also runs the risk of presenting additional inaccuracies. For example, inaccuracies in the system may not be uniform across all data points. Therefore when a set adjustment is made across the data gathered by the detection system based on the motion of the vehicle, for example, the adjustment may correct some inaccuracies while not doing enough to correct for other inaccuracies, or even driving other data to be more inaccurate than prior to applying the adjustment. As such, detection systems struggle to accurately account for all errors in the gathered data even when some amount of error is expected.

SUMMARY OF THE TECHNOLOGY

In light of the needs described above, in at least one aspect, the subject technology relates to a detection system, and method of detection, for a vehicle which accounts for various errors at different points across a range of the detection system's field of view, rather than applying uniform corrections across an entire range.

In at least one aspect, the subject technology relates to a method of characterizing targets in an environment around a vehicle using a detection system. A plurality of signals are transmitted into the environment for reflecting off at least one target in the environment to create return signals, the signals being transmitted across an azimuth range and an elevation range to define a field of view for the detection system. The return signals are received. An initial characterization is determined for each of the at least one targets, the initial characterizations including a distance, a reference speed, and a return angle based on one of the return signals and the initial characterizations are adjusted based on ego-motion of the vehicle. Each of the initial characterizations are assigned to one of a plurality of bins based on the return angles, each bin corresponding to a segment of the azimuth range such that the entire azimuth range is accounted for, the bins comprising a plurality of left side bins corresponding to a left side of the azimuth range with respect to a boresight and a plurality of right side bins corresponding to a right side of the azimuth range with respect to the boresight, the left side bins corresponding to right side bins covering opposite azimuth ranges with respect to boresight. Over time, a bin correction is determined for each bin based on the corresponding segment of the azimuth range with respect to the boresight. Over time a plurality of the initial characterizations assigned to left side bins are compared with a plurality of the initial characterizations assigned to corresponding right side bins to calculate an orientation correction for a plurality of the bins. A final characterization is calculated for each of the targets by adjusting the initial characterization for said target based on one of the bin corrections and one of the orientation corrections.

In some embodiments, the boresight is at a central location of the vehicle with respect to the azimuth range, the boresight facing a forward direction of the vehicle, the boresight dividing the azimuth range at the central location between a left side of the vehicle and a right side of the vehicle. In some cases, determining the initial characterization for the targets includes discriminating between moving targets and stationary targets and discarding data related to moving targets, the initial characterizations relating to stationary targets.

In some embodiments, the steps of transmitting signals, receiving signals, determining initial characterizations for the targets, and assigning the initial characterizations to bins can be repeated over a first set time period, and the method can further include sampling return signals over the first time period, categorizing the return signals as inliers or outliers, and discarding the outliers. The bin correction for each bin can then be based on the initial characterizations of the inliers.

In some embodiments, the steps of transmitting signals, receiving signals, determining initial characterizations for the targets, and assigning the initial characterizations to bins can be repeated over a second set time period. The method then further includes comparing the plurality of the initial characterizations of the return signals assigned to left side bins with the plurality of the initial characterizations of the return signals assigned to corresponding right side bins over the second time period to calculate the orientation corrections. The second set time period can allow for a plurality of repetitions of the aforementioned steps.

In some embodiments, the segments each account for approximately 5 degrees of the azimuth range. In other cases, the segments each account for approximately 1 degree of the azimuth range. In other cases, the segments each account for approximately 0.5 degrees of the azimuth range. In some embodiments, comparing the plurality of the initial characterizations assigned to left side bins with the plurality of the initial characterizations assigned to corresponding right side bins includes comparing reference speed of said initial characterizations and the orientation correction is a return angle offset.

In at least one aspect, the subject technology relates to a detection system for a vehicle in an environment. A transmitter is configured to transmit a plurality of signals into the environment for reflecting off at least one target in the environment to create return signals, the signals being transmitted across an azimuth range and an elevation range to define a field of view for the detection system. A receiver is configured to receive the return signals. At least one processing module with memory configured is also configured to carry out a number of functions, including: determining an initial characterization each of the targets, the initial characterizations including a distance, a reference speed, and a return angle based on one of the return signals and adjusting the initial characterizations based on ego-motion of the vehicle; assigning each of the initial characterizations to one of a plurality of bins based on the return angles, each bin corresponding to a segment of the azimuth range such that the entire azimuth range is accounted for, the bins comprising a plurality of left side bins corresponding to a left side of the azimuth range with respect to a boresight and a plurality of right side bins corresponding to a right side of the azimuth range with respect to the boresight, the left side bins corresponding to right side bins covering opposite azimuth ranges with respect to boresight; determining a bin correction for each bin based on the corresponding segment of the azimuth range with respect to the boresight; comparing a plurality of the initial characterizations assigned to left side bins with a plurality of the initial characterizations assigned to corresponding right side bins to calculate an orientation correction for a plurality of the bins; and calculating a final characterization for each of the targets by adjusting the initial characterization for said target based on one of the bin corrections and one of the orientation corrections.

In some embodiments, the detection system is positioned on a vehicle such that the boresight is at a front and central location of the vehicle with respect to the azimuth range, the boresight facing in a forward direction of the vehicle, the boresight dividing the azimuth range at the central location between a left side of the vehicle and a right side of the vehicle. In some embodiments, the at least one processing module with memory is further configured to: discriminate between moving targets and stationary targets and discard data related to moving targets when determining the initial characterizations, the initial characterizations relating to stationary targets.

In some embodiments, the detection system is configured to sample return signals over a first set time period and categorize the return signals as inliers or outliers and discard the outliers. The bin correction for each bin is then based on the initial characterizations of the inliers. In some embodiments the detection system is configured to: sample signals over a second time period and determine the bin corrections over the second time period. The detection system then compares the plurality of return signals assigned to left side bins with the plurality of return signals assigned to corresponding right side bins over the second time period to calculate the bin orientation corrections. In some cases, the second time period allows a plurality of repetitions of transmissions of signals by the transmitter across the azimuth range.

In some embodiments, the segments of the azimuth range each account for approximately 5 degrees of azimuth range. In other cases, the segments of the azimuth range each account for approximately 1 degree of azimuth range. In other cases, the segments of the azimuth range each account for approximately 0.5 degrees of azimuth range.

In some embodiments, the processing module is further configured such that when comparing the plurality of the initial characterizations assigned to left side bins with the plurality of the initial characterizations assigned to corresponding right side bins, the processing module compares reference speed of said initial characterizations and orientation correction is a return angle offset.

BRIEF DESCRIPTION OF THE DRAWINGS

So that those having ordinary skill in the art to which the disclosed system pertains will more readily understand how to make and use the same, reference may be had to the following drawings.

FIG. 3a is an exemplary schematic diagram showing relative target and vehicle velocities in accordance with the subject technology.

FIG. 3b is a graph of Doppler returns over azimuth range for the detection system of the vehicle in FIG. 3a.

FIG. 7a is a graph comparing return signal speed for signals on the left and right side of a boresight in accordance with the subject technology.

FIG. 7b is a graph of angular offsets corresponding to differences in the return signals on the left and right side of a boresight in accordance with the subject technology.

DETAILED DESCRIPTION

Figure 1:
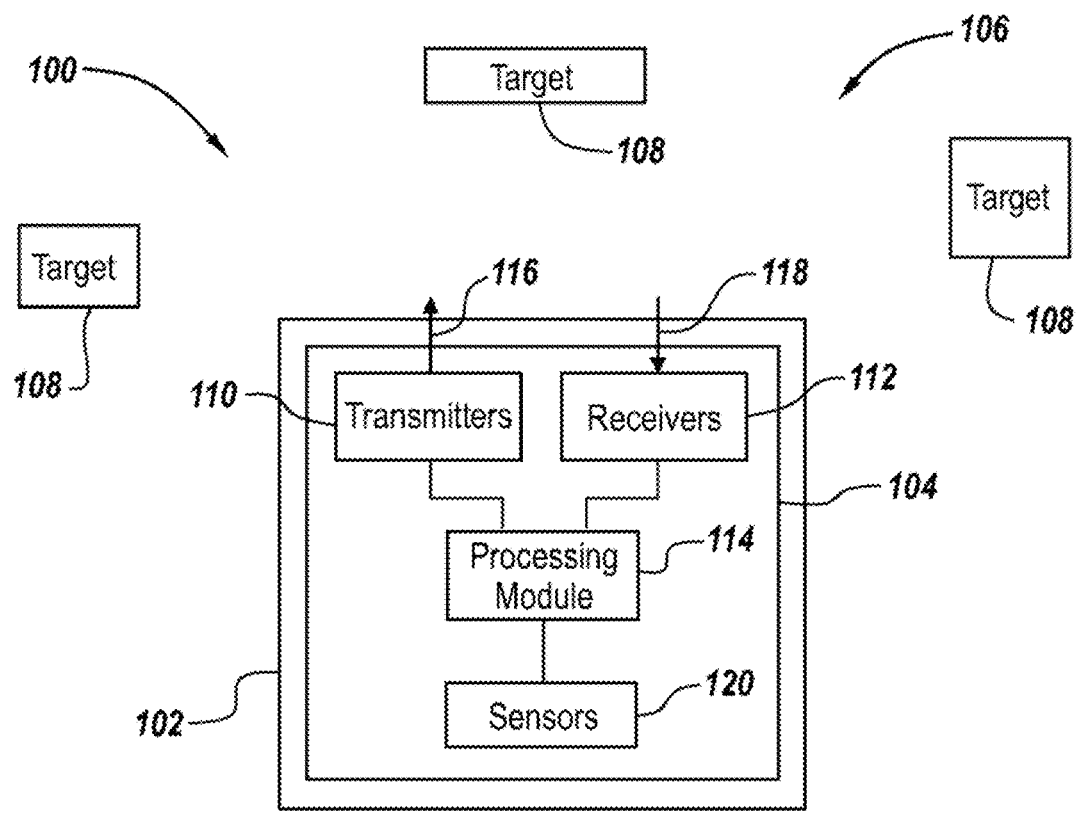
FIG. 1 is a block diagram of an environment and vehicle configured in accordance with the subject technology.

The subject technology overcomes many of the prior art problems associated with vehicle detection systems. In brief summary, the subject technology provides a detection system that characterizes targets based on the ego-motion of a vehicle and makes adjustments based on the azimuth position of the target to obtain a more accurate measurement. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1 a block diagram of a vehicle 102 with a simplified detection system 104 is shown generally at 100. The vehicle 102 is located within an environment 106 which includes a number of targets 108. The vehicle 102 has a detection system 104 which includes the necessary components for detecting the targets 108 within the environment 106 around the vehicle 102. To that end, the detection system 104 includes transmitters 110, receivers 112, and a processing module 114. The transmitters 110 are configured to transmit a plurality of signals 116, such as typical radar signals, into the environment 106 across an azimuth range and an elevation range, defining the field of view for the detection system 104. The signals 116 reflect off targets 108 in the environment 106 and are returned to the vehicle 102, the return signals 118 being received by the receivers 112. The processing module 114 can include a processor, memory, and generally, any other necessary components for carrying out the functions of the processing module, or the processing functions of the detection system as a whole, such as individual application specific integrated circuits or multiple separate processors and memory banks. The processing module 114 communicates with the transmitters 110 and receivers 112 to facilitate the transmission of the signals 116, and receive and store data related to the return signals 118 and the detection process generally. The detection system 104 can include other components for transmitting, receiving, processing and storing the signals, and detecting objects generally, as are known in the art, such as typical radar components such as antennas, filters, and the like.

The detection system 104 is capable of processing the return signals 118 to determine an initial characterization of the targets 108 based on the return signals 118 that reflected of those targets 108. The detection system 104 also includes sensors 120 which track various characteristics of the vehicle 102. The detection system 104 relies on data from the sensors 120 which are configured to communicate with the processing module 114. The sensors 120 can include typical sensors found on vehicles, such as wheel speed sensors, road or steering wheel angle sensors, gyroscopes, or accelerometers, or additional sensors included for the particular purpose of aiding the detection system 104. The processing module 114 uses the data reported from the sensors 120 to learn movement characteristics of the vehicle 102 at a given time, such as speed, direction, and orientation. For example, data from the wheel speed sensors can be used to determine the speed at which the vehicle 102 is traveling, while data from the accelerometers can be provided to determine whether the vehicle 102 is speeding up or slowing down. Gyroscopes can be used to determine the current orientation of the vehicle 102, and whether it is experiencing a pitch or yaw. Road or steering wheel sensors can provide data on the direction in which the vehicle 102 is being steered, and how the direction of movement of the vehicle 102 is changing (i.e. how much the vehicle 102 is turning). Based on data from the sensors 120, the detection system 104 is configured to make adjustments to an initial target characterizations based on the ego-motion of the vehicle. Further adjustments are then made to the estimated initial positions, as described in more detail below.

Figure 2:
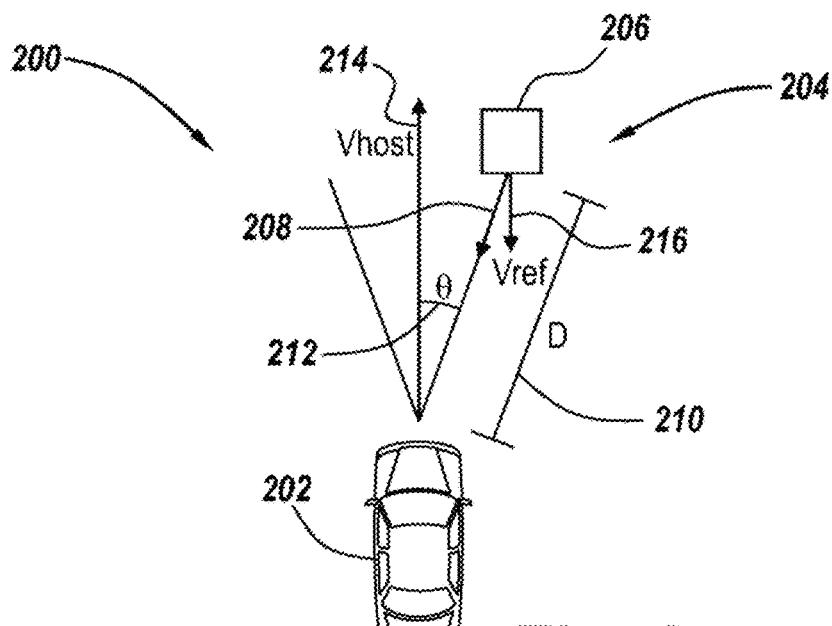
FIG. 2 is a schematic diagram of a vehicle detection system operating in accordance with the subject technology.

Referring now to FIG. 2, a schematic diagram of a vehicle 202 with a detection system within an environment 204 is shown generally at 200. The vehicle 202 transmits signals into the environment 204. The transmitted signals reflect off a target 206 within the environment 204 and are returned to the vehicle 202, as shown by exemplary return signal 208. The detection system can then proceed with an initial characterization of the target 206 using known techniques for determining target characteristics in vehicle detection systems. The initial characterization will include an estimated distance (D) 210 between the vehicle 202 and the target 206. The initial characterization will also include a return angle (θ) 212, which is the angle between the return signal 208 and the direction of the host vehicle velocity 214, and serves as an estimate of the angle between the forward direction of the vehicle 202 and the target 206. Further, the initial characterization will include a reference velocity 216 of the target 206, which is the perceived velocity of the target 206 from the perspective of the vehicle 202. Assuming the target 206 is stationary, the reference velocity 216 of the target will be equal in magnitude to that of the host vehicle velocity 214. As described above, adjustments can then be made based on the ego-motion of the vehicle 202, as determined from data from the sensors. For example, when the vehicle 202 is moving, the return angle (θ) 212 will not represent the true angle between the vehicle detection system and the target 206 at the time the return signal 208 is received, since the vehicle 202 and target 206 were in different relative positions at the time the signal was transmitted from the vehicle 202, the signal reflected off the target 206, and the return signal 208 was received by the vehicle 202. As such, the distance (D) 210, reference velocity 216, and return angle (θ) 212, can be updated in the initial characterization based on the vehicle 202 motion.

The vehicle 202 detection system can determine if the target 206 is a moving or stationary object, by comparing the relative motion of the target 206, determined from the data from the return signals 208, to the known movement characteristics of the vehicle 202. If the relative movement of the target 206 is the same as the actual movement of the vehicle 202 (i.e. the same movement but in the opposite direction), the target 206 is deemed stationary. In at least one embodiment, the detection system is concerned with stationary, rather than moving targets 206. In that case, data related to moving targets 206 is discarded.

Figure 3:
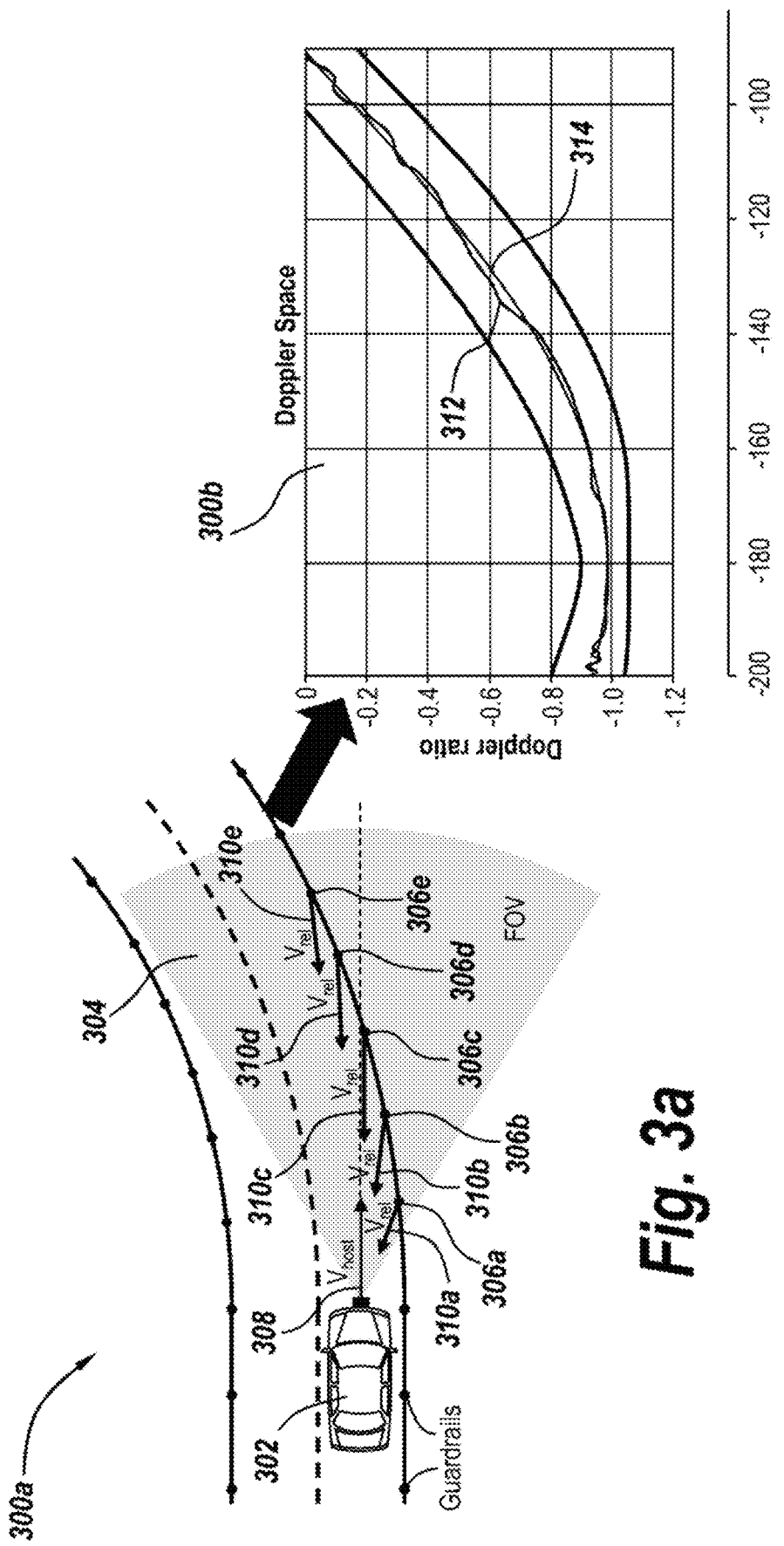

Referring now to FIGS. 3a-3b, an exemplary schematic diagram showing relative target velocity is shown generally at 300a. The vehicle 302 has a host velocity 308 as it travels through the environment. The azimuth range 304 of the detection system of the vehicle 302 defines the field of view of the vehicle 302 in azimuth, within which the detection system is transmitting signals. The diagram 300a shows a number of different guardrail points 306a-306e (generally 306) within the azimuth range 304 which are reflecting return signals back to the vehicle 302. Although the guardrail points 306 are stationary, the guardrail points 306 each have a reference velocity 310a-310e (generally 310), which is their perceived velocity from the perspective of the vehicle 302 based on their stationary position and the movement of the vehicle 302.

The stationary detections of guardrail points 306 are relied upon to generate graph 300b. The stationary detections are represented by line 312, showing depicting the Doppler ratio (y-axis) over the azimuth range (x-axis). An expected position for stationary targets is also graphed, represented by line 314. The expected position of the guardrail points 306 is based on the host velocity of the vehicle 308 and the return angle of the reflected signals from the detection system. If the stationary detections line 312 and expected position line 314 are very close, as shown in graph 300b, it is a good indicator that the objects 306 are stationary.

Figure 4:
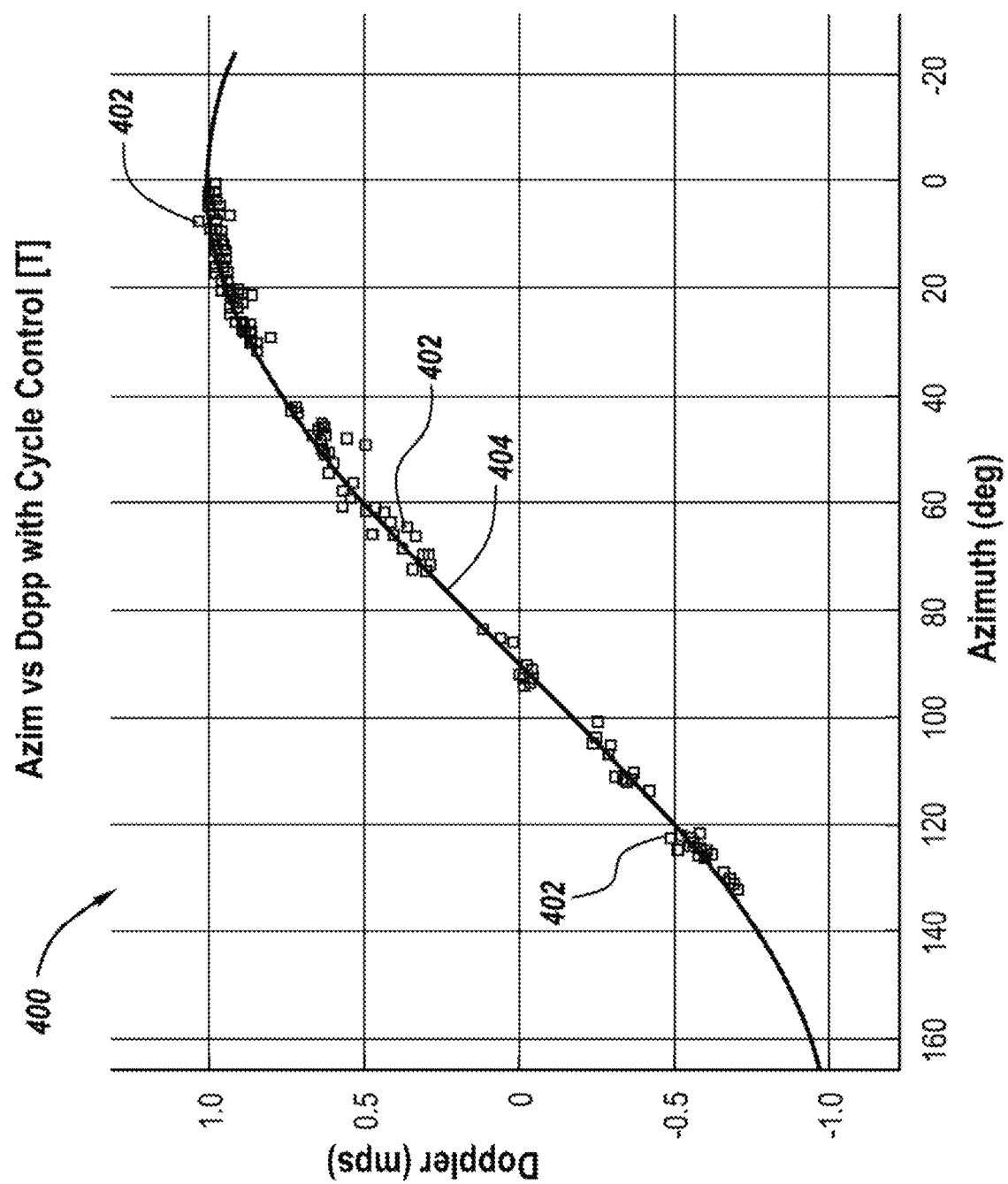
FIG. 4 is a graph of adjusted return signal Doppler over azimuth range, in accordance with the subject technology.

Referring now to FIG. 4, a graph of return signal Doppler, adjusted as described below, is shown generally at 400. The y-axis of the graph 400 is the Doppler (mps) of the adjusted return signals while the x-axis is the azimuth position. The detection system relies on the initial position estimate for each target, which is the original return signal velocity normalized and adjusted based on the ego-motion of the vehicle. The adjusted initial position estimates are reflected in the graphed Doppler of the adjusted return signals of the targets over the azimuth range for the vehicle. In this case, the azimuth range is represented as running roughly from 140 degrees to 0 degrees, with the boresight being at 70 degrees. Notably, in different embodiments, the azimuth range can differ from that shown in the example of FIG. 4 and encompass other ranges, such as 45 degrees per side for a total range of 90 degrees, 60 degrees per side, or some other range. Each point 402 on the graph 400 represents the Doppler velocity of a return signal with respect to azimuth range, as determined after the ego-motion adjustments, with line 404 representing the graph line of these points 402.

After the adjustments based on the ego-motion of the vehicle, the processing module of the detection system is configured to make further adjustments based on the target location within the azimuth range with respect to the detection system boresight (i.e. based on the angle of return signals reflecting off that target after ego-motion adjustments). For this purpose, a plurality of bins are set up, each bin corresponding to a segment of the azimuth range, such that the entire azimuth range is accounted for. The size of the segment of the azimuth range that each bin corresponds to can be different in various applications, however, exemplary sizes that have been found to be effective include approximately (i.e. +/−10%) 5 degrees, 1 degree, or 0.5 degrees of the azimuth range. For example, the return signals that generated graph line 404 can be placed in bins which each account for roughly one degree of the azimuth range, resulting in one bin between 0-1 degrees, another bin between 1-2 degrees, and so on across the azimuth range. The processing module then analyzes the return signals and adjusts them depending on where they fall within the azimuth range based on their corresponding initial target characterization. For example, after applying the ego-motion adjustments, if it is determined that a return signal has returned from a target that is at an angle of 122.5 degrees in the azimuth range, that return signal is assigned to the bin corresponding to between 122-123 degrees of azimuth range. All other return signals returning form targets that are determined to be at an angle of between 122-123 degrees in azimuth would be placed in that same bin. This is carried out for all return signals, with the return signals being assigned to bins according to their corresponding target's initial characterization based on where that target is estimated to be within the azimuth range, the return signals being assigned to bins that associated with the segments of the azimuth range corresponding to the azimuth angle (i.e. signal return angle) determined for the target they reflected off. Further bin corrections are made to the initial characterizations based on the bin to which each initial characterization is assigned.

Figure 5:
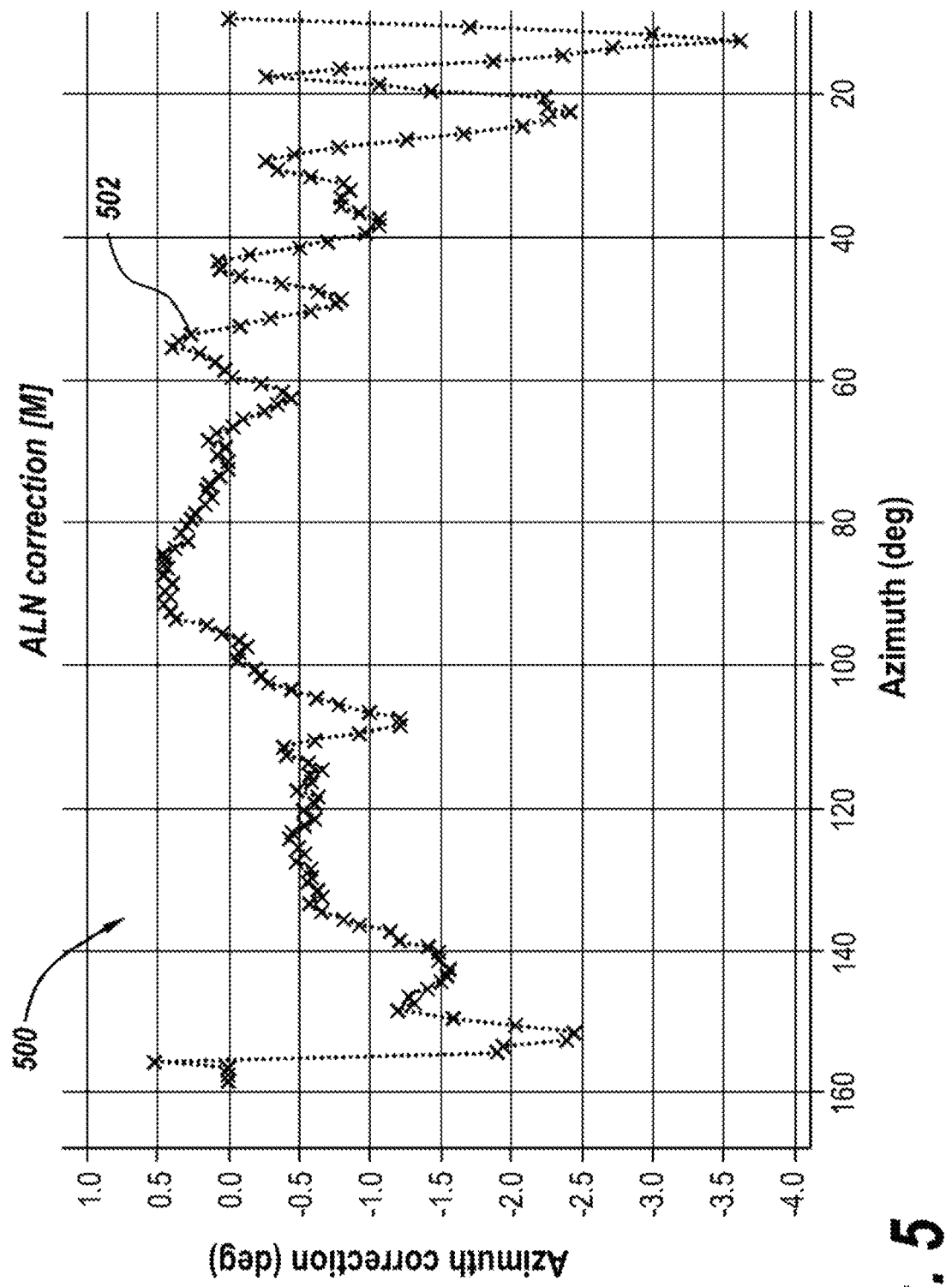
FIG. 5 is a graph of return angle corrections based on azimuth range in accordance with the subject technology.

Referring now to FIG. 5, a graph 500 of a final error curve 502 of bin corrections is shown. After assigning the data from the initial characterizations to bins, the graph 500 is generated by averaging the Doppler value of each target characterized within that bin. So, for example, if 150 bins are used then 150 Doppler values will be relied upon-one for the average Doppler from each bin. For each bin, a true return signal angle is then determined, based on the ratio between the reference velocity magnitude and the host vehicle velocity magnitude, adjusted based on the ego-motion of the vehicle. The processing module then determines a difference between this true return signal angle and the originally measured return signal angle (i.e. the actual return signal angle when the return signal is initially received). The difference between the true return signal angle and the measured return signal angle, with respect to each bin, becomes the bin correction for that bin. Graph line 502 depicts an exemplary bin correction for each bin across the azimuth range based on this difference. The bin correction for each bin is applied to the characterizations within that bin to determine as part of the process of again adjusting the initial target characterization to determine a final characterization.

Placing the data for the return signals into bins and applying different bin corrections based on the location of each bin across the azimuth range can yield a number of advantages. All detection systems have a number of sources of error. For example, detection systems on vehicles include sources of error resulting from their positioning on the vehicle which is normally within the bumper of the vehicle. This can create distortion of the transmitted and received signals, which can result in inaccurate measurements by the detection system. Corrections are often applied on a system-wide basis, which fails to account for the fact that some of these errors can be more prominent in different areas of the azimuth range. In the example of signals passing through the bumper, signals in the wider areas of the azimuth range pass through a longer distance of the bumper than signals near the boresight, and therefore can be expected to experience larger inaccuracies. The aforementioned method of binning data and correcting based on position of the corresponding target with respect to the azimuth range can account for differences in errors across the spectrum of the azimuth range.

Figure 6:
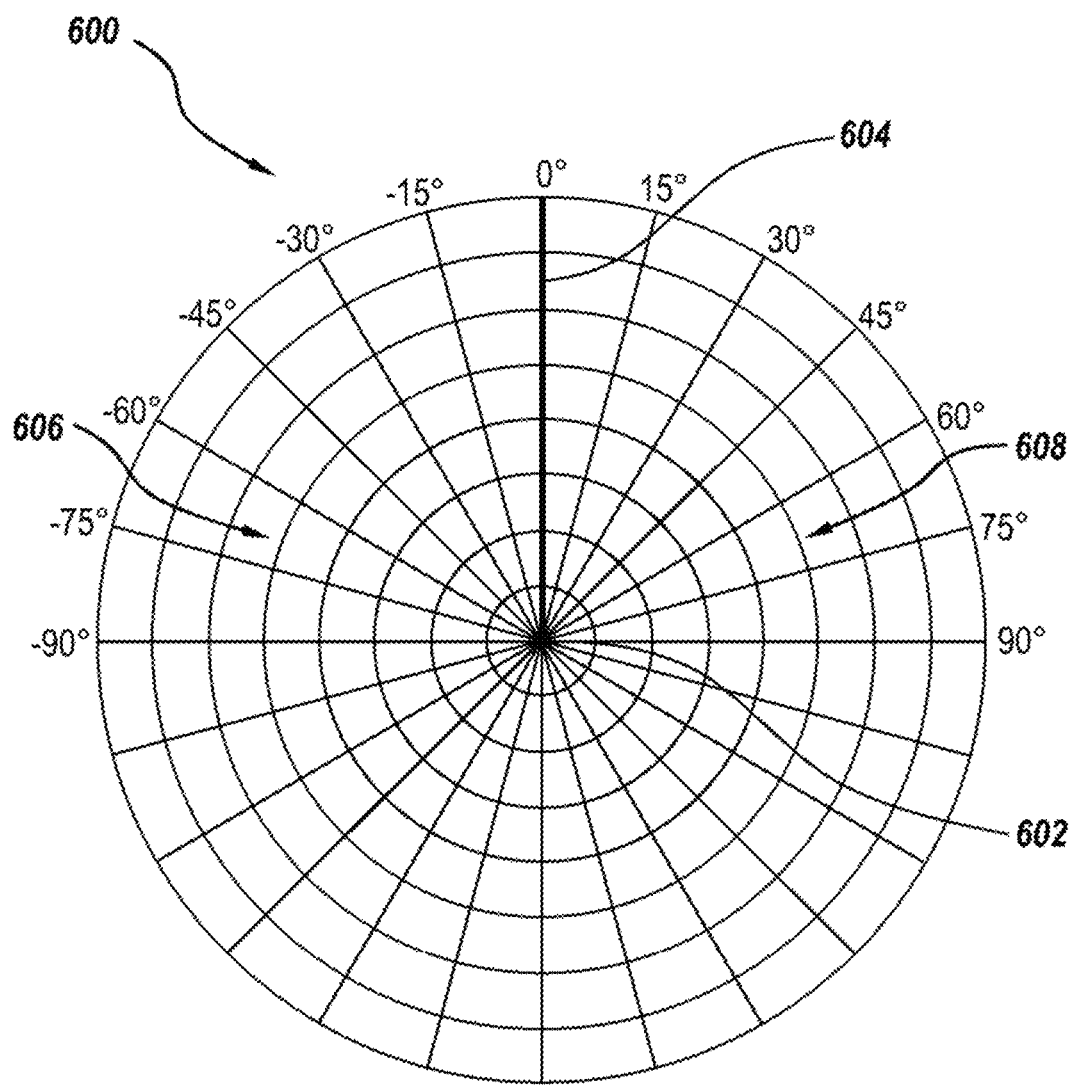
FIG. 6 is an overhead view showing the azimuth range for a detection system of a vehicle in accordance with the subject technology.

Additional orientation corrections can also be made based on errors determined by viewing differences in bins covering the same segment of the azimuth range on left and right sides of the vehicle. To that end, referring now to FIG. 6, an overhead graph 600 showing the azimuth range of a detection system for a vehicle 602 in accordance with the subject technology is shown. For simplicity, 0 degrees on the graph 600 is located at the boresight 604 of the detection system and the vehicle 602 is assumed to have an azimuth range of 180 degrees around boresight (between −90 degrees and 90 degrees on either side). Thus, the left side of the azimuth range 606 is located on the left side of the boresight 604, between −90 degrees and 0 degrees. Conversely the right side of the azimuth range 608 is located on the right side of the boresight 604, between 0 degrees and 90 degrees.

As the initial characterizations are assigned to bins, as described above, consideration will also be given to whether the characterizations are on the left or right side of the boresight 604. Targets with return signals detected on the left side of the azimuth range 606 will be assigned to left side bins while targets with return signals detected on the right side of the azimuth range 608 will be assigned to right side bins. For example, if the bins are each designed to cover one degree of the azimuth range, the left side bins would include one bin for 0 to −1 degree in the azimuth range, another bin for −1 to −2 degrees in the azimuth range, and so on, until bins cover the spectrum of 0 to −90 degrees azimuth. Conversely, the right side bins would include one bin for 0-1 degree, another bin for 1-2 degrees, and so on, up to 90 degrees azimuth. Each left side bin is matched with a corresponding right side bin that covers the opposite azimuth range. Covering the opposite azimuth range, with respect to left and right bins, is used herein to describe when one bin covers a given range on one side, with respect to boresight 604, and another bin covers the same range but on the other side of the boresight 604. For example, if a left side bin covered 0 to −1 degree, the corresponding right side bin covering the opposite azimuth range would be the right side bin covering 0 to 1 degree in the azimuth range. Likewise, if a left side bin covered −50 to −51 degrees, the corresponding right side bin covering the opposite azimuth range would be the right side bin covering 50-51 degrees in the azimuth range. Bin orientation corrections are then determined based on differences in corresponding left and right side bins, as discussed in more detail below.

Referring now to FIG. 7a, a graph 700a showing the initial characterizations of a number of return signals as received by a front looking radar detection system are shown, separated by left and right side return signals in accordance with the subject technology. The graph 700a shows data for the return signals from just over 600 cycles, each cycle representing one transmission of signals across the entire field of view. The graph 700a plots the relative speed (i.e. magnitude of the velocity) of targets from the return signals on the left side of the vehicle 702 and the relative speed of targets from the return signals on the right side of the vehicle 704 over the cycles. The plotted return signals are from stationary targets located in opposite regions of the azimuth range with respect to the left and right side of the boresight. Therefore the targets on the left and right side would be expected, under optimal circumstances with no sources of error, to exhibit similar relative velocities (since all targets are stationary). For example, in some cases, the detection system compares return signals from left side bins to return signals from corresponding right side bins in the relative regions of about 45 and −45 degrees (i.e. the bins between 35-55 degrees, or −35 to −55 degrees) with respect to boresight. So for example, if bins corresponded to segments of the azimuth range of 5 degrees, the system could compare left side data in the bins corresponding to the azimuth range of −40 to −45 degrees to right side data in the bins corresponding to the azimuth range of 40-45 degrees. In some cases, samples can be taken from multiple corresponding ranges on each side, the results being averaged for each side. The graph 700a shows a comparison of one bin from a left side of the boresight to the right side bin covering the opposite azimuth range with respect to the boresight. As can be seen, there is a varying difference between the relative target speed of the left side return signals 702 and right side signals 704 even though the targets are stationary. This is likely attributable to the physical limitations of detection systems, some amount of difference between left and right side return signals being expected in any detection system. As such, the return signals for left side bins 702 and right side bins 704 can be compared over a number of data points, and the variation between the two sides can be averaged to determine an orientation correction that can applied across all bins on a given side (or separate orientation corrections can be applied to bins on both left and right sides, respectively). Alternatively, an adjustment can be made to the sensor detecting the return signals, rotating the sensor in the azimuth direction to account for the offset between left and right side return signals.

Referring now to FIG. 7b, a graph of the difference between the angle of left side return signals and right side return signals is shown at 700b, the difference represented by graph line 708. Each point along the x-axis represents an angular difference from a comparison of the angles of left side return signals to the right side return signals from a similar but opposite region of the azimuth range, as in the plotted data points of graph 700a. For each cycle, there may be multiple return signals from each side corresponding to a given region of the azimuth range. The y-axis of the graph line 708 represents an offset angle difference which accounts for the difference in relative speed of the left and right side return signal being compared at each point on the x-axis. The offset angle difference can be used to calculate the orientation correction. The graph line 708 ignores outliers from return signals of graph 700a, such as plotted return signal 706 which deviates greatly from the other right side return signals 704. The return angle differences represented by graph line 708 can then be averaged, as represented by graph line 710, to determine the average return angle offset difference between right and left side return angle. The average return angle difference 710 is the orientation correction for the detection system. The orientation correction can then be applied to adjust the return angles of the initial characterizations within the left side bins and the right side bins to account for inconsistencies with the return angles on the left and right sides of the boresight. Thus, after the bin corrections and orientation corrections have been determined, more accurate final characterizations of the targets can be determined by adjusting the initial characterizations based on the bin corrections and the orientation corrections.

Figure 8:
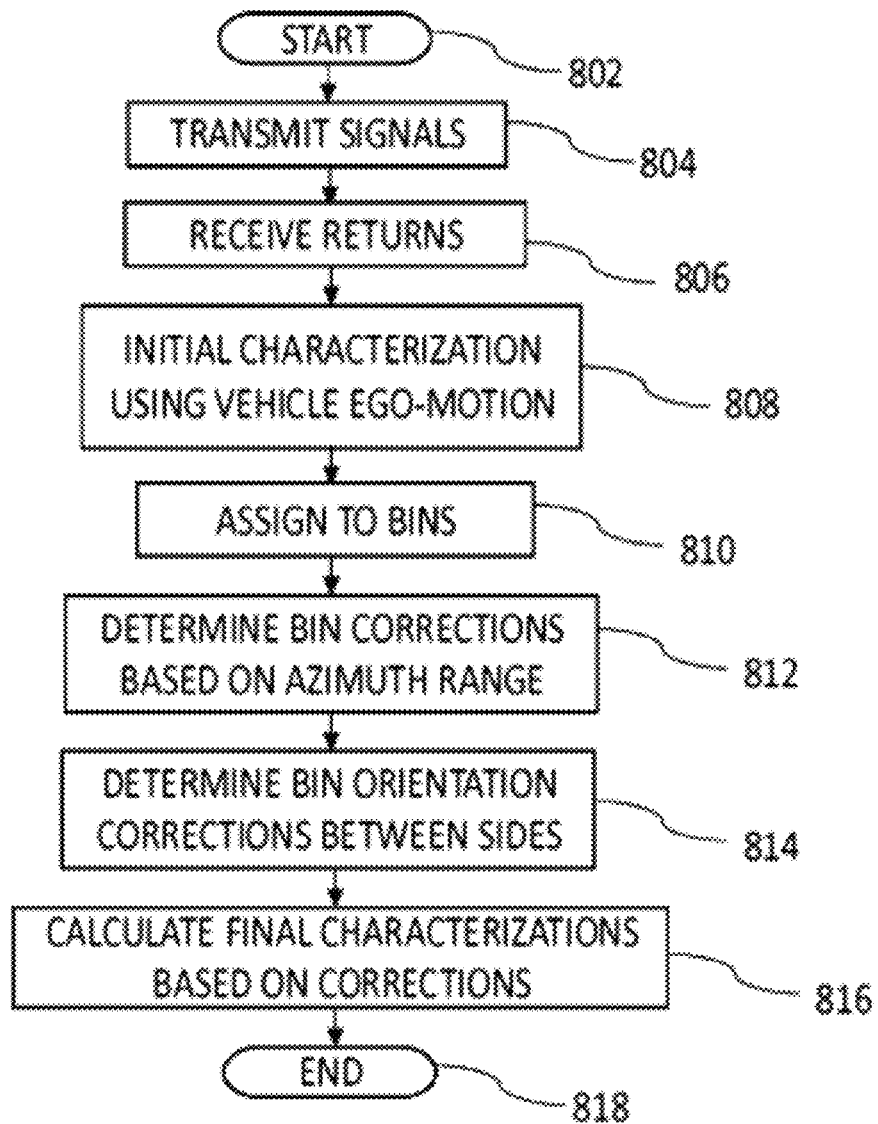
FIG. 8 is a flowchart of a method of characterizing targets in accordance with the subject technology.

Referring now to FIG. 8, a simplified method in accordance with the subject technology is shown generally at 800. The method 800 can be carried out on systems, and using methods, as described above to characterize one or more targets. The method starts at step 802. At step 804, a detection system for a vehicle transmits a plurality of signals into the environment around the vehicle across an azimuth range to define a field of view of the vehicle. At step 806, some of the transmitted signals are received after having reflected off objects in the environment around the vehicle. An initial characterization of each target is then determined, at step 808, based on the received return signals. The initial characterizations are adjusted based on the ego-motion of the vehicle, which relates to movement characteristics of the vehicle which affect the perception of the detection system, such as vehicle velocity, acceleration, yaw, and pitch. The initial characterizations include a distance, a reference velocity magnitude (i.e. speed), and a return angle for the targets. Typically, steps 802-808 are repeated for a number of cycles to generate enough data to perform the steps discussed below.

At step 810, the initial characterizations are assigned to a plurality of bins based on the segment of the azimuth range to which they correspond. The initial characterizations are also assigned to left or right side bins depending on where the corresponding target is located with respect to boresight. At step 812, a bin correction is determined for each bin based on which segment of the azimuth range the bin is located within with respect to boresight, as described in detail above. At step 814, a bin orientation correction is determined, which is applied to bins based on their side with respect to boresight, as discussed in detail above. Both steps 812 and 814 are carried out over some time period, such as 200, 400, or 600 cycles, to gather enough data to generate reliable corrections. At step 816, adjustments are made to the initial characterizations based on the bin to which the initial characterization is assigned to calculate final characterizations. As such, adjustments are made to the initial characterizations based on the bin corrections and orientations corrections to calculate final characterizations for one or more of the targets within the environment. In this way, the detection system is able to account for errors across specific portions of the azimuth range, and differences across sides of the detection system, to calculate accurate final characterizations for the targets. The final characterizations can then be sent to the vehicle and used for collision avoidance, self-driving applications, or other applications where accurate target characterization in a vehicle detection system is important. At step 818, the process is complete, but can be repeated as necessary for further target characterization. In some cases, the steps of calculating bin and orientation corrections 812, 814 can be skipped during one or more repetitions, and the previously calculated corrections can be applied to the new initial target characterizations.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A method of characterizing targets in an environment around a vehicle using a detection system, comprising:
   a) transmitting a plurality of signals into the environment for reflecting off at least one target in the environment to create return signals, the signals being transmitted across an azimuth range and an elevation range to define a field of view for the detection system;
   b) receiving the return signals;
   c) determining an initial characterization for each of the at least one targets, the initial characterizations including a distance, a reference speed, and a return angle based on one of the return signals and adjusting the initial characterizations based on ego-motion of the vehicle;
   d) assigning each of the initial characterizations to one of a plurality of bins based on the return angles, each bin corresponding to a segment of the azimuth range such that the entire azimuth range is accounted for, the bins comprising a plurality of left side bins corresponding to a left side of the azimuth range with respect to a boresight and a plurality of right side bins corresponding to a right side of the azimuth range with respect to the boresight, the left side bins corresponding to right side bins covering opposite azimuth ranges with respect to boresight;
   e) determining, over time, a bin correction for each bin based on the corresponding segment of the azimuth range with respect to the boresight;
   f) comparing, over time, a plurality of the initial characterizations assigned to left side bins with a plurality of the initial characterizations assigned to corresponding right side bins to calculate an orientation correction for a plurality of the bins;
   g) calculating a final characterization for each of the targets by adjusting the initial characterization for said target based on one of the bin corrections and one of the orientation corrections.

2. The method of claim 1, wherein the boresight is at a central location of the vehicle with respect to the azimuth range, the boresight facing a forward direction of the vehicle, the boresight dividing the azimuth range at the central location between a left side of the vehicle and a right side of the vehicle.

3. The method of claim 1, wherein step c) comprises discriminating between moving targets and stationary targets and discarding data related to moving targets, the initial characterizations relating to stationary targets.

4. The method of claim 3, wherein step e) comprises:
   repeating steps a)-d) over a first set time period; and
   sampling the return signals over the first set time period, categorizing the return signals as inliers or outliers, and discarding the outliers,
   wherein the bin correction for each bin is based on the initial characterizations of the inliers.

5. The method of claim 4, wherein step g) comprises:
   repeating steps a)-d) over a second set time period; and
   comparing the plurality of the initial characterizations of the return signals assigned to left side bins with the plurality of the initial characterizations of the return signals assigned to corresponding right side bins over the second time period to calculate the orientation corrections.

6. The method of claim 5, wherein the second set time period allows for a plurality of repetitions of steps a)-d).

7. The method of claim 1, wherein the segments each account for approximately 5 degrees of the azimuth range.

8. The method of claim 1, wherein the segments each account for approximately 1 degree of the azimuth range.

9. The method of claim 1, wherein the segments each account for approximately 0.5 degrees of the azimuth range.

10. The method of claim 1, wherein during step f):
    comparing the plurality of the initial characterizations assigned to left side bins with the plurality of the initial characterizations assigned to corresponding right side bins includes comparing reference speed of said initial characterizations; and
    the orientation correction is a return angle offset.

11. A detection system for a vehicle in an environment, comprising:
    a transmitter configured to transmit a plurality of signals into the environment for reflecting off at least one target in the environment to create return signals, the signals being transmitted across an azimuth range and an elevation range to define a field of view for the detection system;
    a receiver configured to receive the return signals;
    at least one processing module with memory configured to:
    determine an initial characterization each of the targets, the initial characterizations including a distance, a reference speed, and a return angle based on one of the return signals and adjusting the initial characterizations based on ego-motion of the vehicle;
    assign each of the initial characterizations to one of a plurality of bins based on the return angles, each bin corresponding to a segment of the azimuth range such that the entire azimuth range is accounted for, the bins comprising a plurality of left side bins corresponding to a left side of the azimuth range with respect to a boresight and a plurality of right side bins corresponding to a right side of the azimuth range with respect to the boresight, the left side bins corresponding to right side bins covering opposite azimuth ranges with respect to boresight;
    determine a bin correction for each bin based on the corresponding segment of the azimuth range with respect to the boresight;
    compare a plurality of the initial characterizations assigned to left side bins with a plurality of the initial characterizations assigned to corresponding right side bins to calculate an orientation correction for a plurality of the bins; and
    calculate a final characterization for each of the targets by adjusting the initial characterization for said target based on one of the bin corrections and one of the orientation corrections.

12. The detection system of claim 11 wherein the detection system is positioned on a vehicle such that the boresight is at a front and central location of the vehicle with respect to the azimuth range, the boresight facing in a forward direction of the vehicle, the boresight dividing the azimuth range at the central location between a left side of the vehicle and a right side of the vehicle.

13. The detection system of claim 11, wherein the at least one processing module with memory is further configured to: discriminate between moving targets and stationary targets and discard data related to moving targets when determining the initial characterizations, the initial characterizations relating to stationary targets.

14. The detection system of claim 11, wherein the detection system is configured to sample return signals over a first set time period and categorize the return signals as inliers or outliers and discard the outliers; and
the bin correction for each bin is based on the initial characterizations of the inliers.

15. The detection system of claim 14, wherein the detection system is configured to:
sample signals over a second time period and determine the bin corrections over the second time period; and
compare the plurality of return signals assigned to left side bins with the plurality of return signals assigned to corresponding right side bins over the second time period to calculate the bin orientation corrections.

16. The detection system of claim 15, wherein the second time period allows a plurality of repetitions of transmissions of signals by the transmitter across the azimuth range.

17. The detection system of claim 11, wherein the segments of the azimuth range each account for approximately 5 degrees of azimuth range.

18. The detection system of claim 11, wherein the segments of the azimuth range each account for approximately 1 degree of azimuth range.

19. The detection system of claim 11, wherein the segments of the azimuth range each account for approximately 0.5 degrees of azimuth range.

20. The detection system of claim 11, wherein the at least one processing module is further configured such that when comparing the plurality of the initial characterizations assigned to left side bins with the plurality of the initial characterizations assigned to corresponding right side bins, the at least one processing module compares reference speed of said initial characterizations and orientation correction is a return angle offset.

* * * * *